United States Patent
Daniel

(10) Patent No.: US 9,247,282 B1
(45) Date of Patent: Jan. 26, 2016

(54) SYSTEM AND METHOD FOR INTERACTIVE ACCESS OF MEDIA CONTENT

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 0 days.

(21) Appl. No.: 14/476,499

(22) Filed: Sep. 3, 2014

Related U.S. Application Data

(63) Continuation-in-part of application No. 13/925,622, filed on Jun. 24, 2013.

(60) Provisional application No. 61/873,176, filed on Sep. 3, 2013.

(51) Int. Cl.
| | |
|---|---|
| *H04N 21/431* | (2011.01) |
| *H04N 21/81* | (2011.01) |
| *H04N 21/214* | (2011.01) |
| *H04N 21/414* | (2011.01) |
| *H04N 21/472* | (2011.01) |
| *H04N 21/4722* | (2011.01) |
| *G06F 3/0486* | (2013.01) |
| *G06F 3/0481* | (2013.01) |

(52) U.S. Cl.
CPC .......... *H04N 21/4312* (2013.01); *G06F 3/0486* (2013.01); *G06F 3/04817* (2013.01); *H04N 21/2143* (2013.01); *H04N 21/41407* (2013.01); *H04N 21/4722* (2013.01); *H04N 21/47217* (2013.01); *H04N 21/8126* (2013.01); *H04N 21/8173* (2013.01)

(58) Field of Classification Search
USPC .................. 725/38, 52, 61, 78, 133, 141, 153
See application file for complete search history.

(56) References Cited

U.S. PATENT DOCUMENTS

| | | | |
|---|---|---|---|
| 2008/0066111 A1* | 3/2008 | Ellis et al. | 725/57 |
| 2009/0019507 A1* | 1/2009 | White | 725/110 |
| 2010/0262928 A1* | 10/2010 | Abbott | 715/769 |

* cited by examiner

*Primary Examiner* — Mulugeta Mengesha

(74) *Attorney, Agent, or Firm* — Carol N. Green Kaul, Esq.

(57) ABSTRACT

The present disclosure relates generally to electronic systems, apparatuses, and methods, and more particularly, to systems, methods, and various other disclosures related to interactive accessing of multimedia content (videos, games, scores) wherein users may access content remotely that is being broadcasted from, or authorized to be broadcasted from a media device located at a venue, e.g. home, university, etc., to a mobile networked enabled device. System and method also includes a custom graphical user interface that user may access the multimedia content using embedded icons that become visible upon activation of the custom graphical user interface wherein the activated icons may be used to control the viewing of the multimedia content.

21 Claims, 16 Drawing Sheets

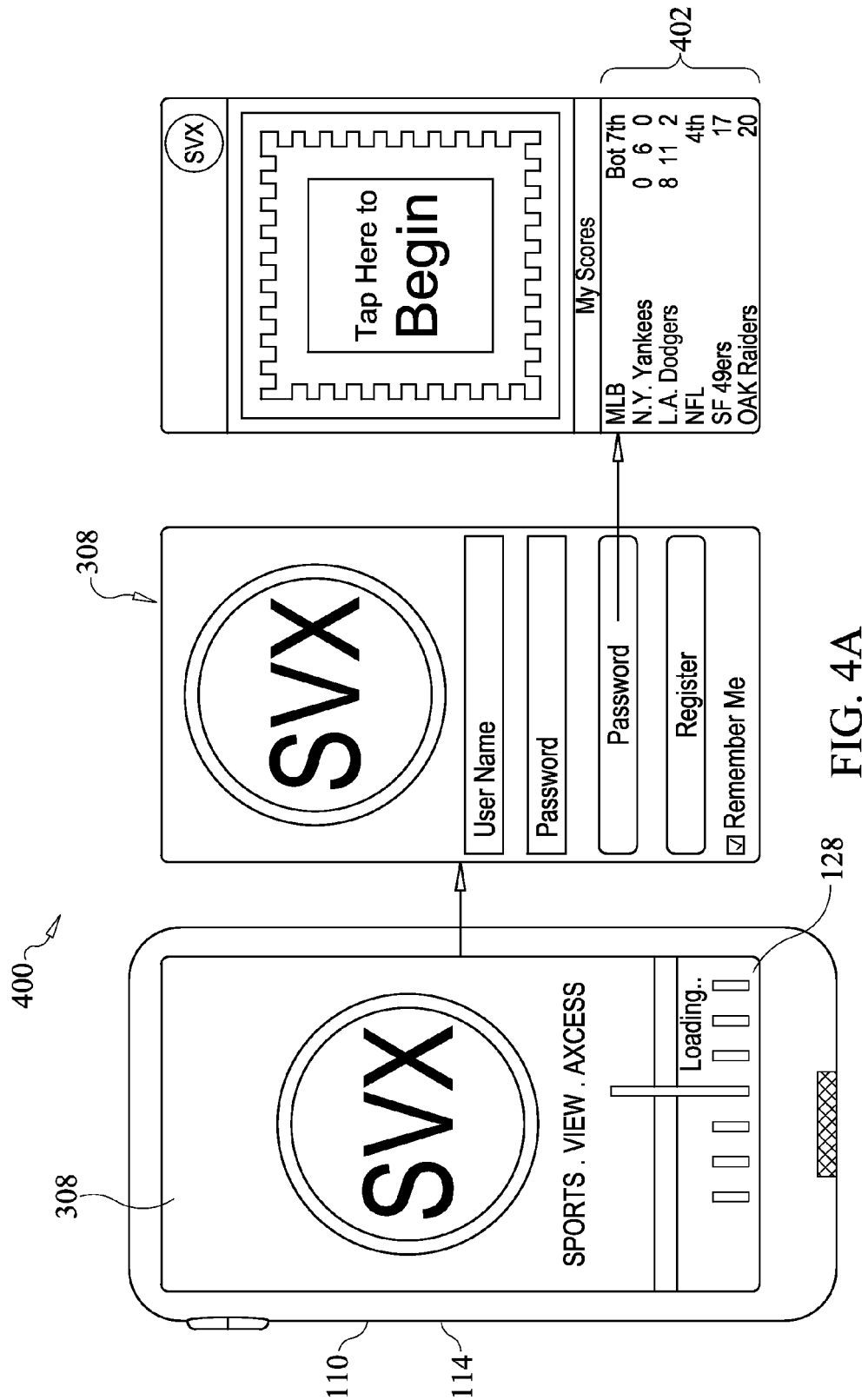

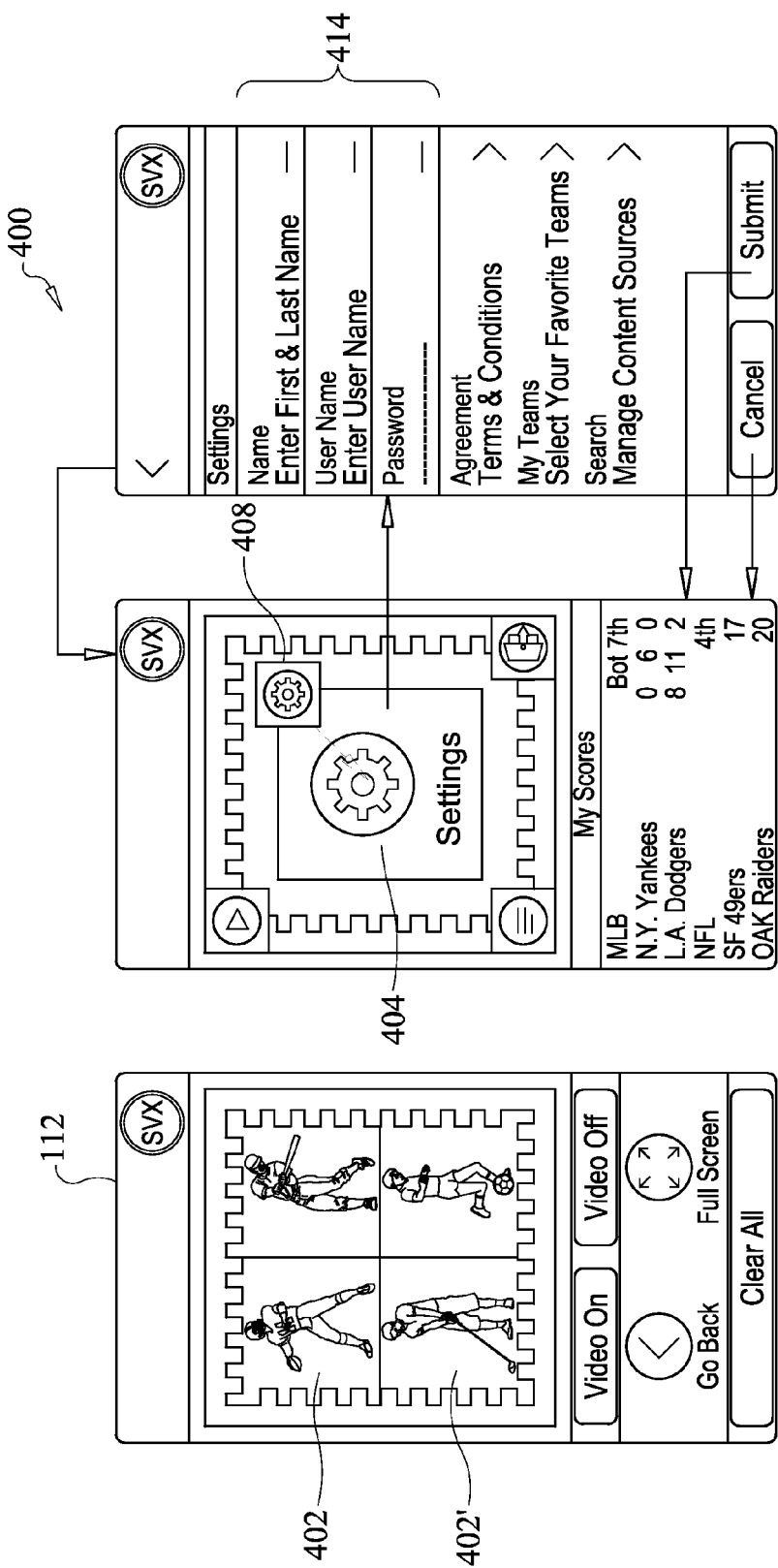

SYSTEM AND METHOD FOR INTERACTIVE ACCESS OF MEDIA CONTENT

PRIORITY CLAIM

This patent application is a non-provisional continuation-in-part patent application and claims priority under 35 U.S.C. §119(e), to U.S. Provisional Patent Application Ser. No. 61/873,176 titled "System And Method For Interactive Access Of Media Content," filed Sep. 3, 2013; and U.S. Non-Provisional patent application Ser. No. 13/925,622 titled "System and Method for Providing Customized Content and Entertainment to Customers of a Venue" filed Jun. 24, 2013. The entire disclosures of the afore-mentioned patent applications are incorporated by reference as if fully stated herein.

FIELD OF THE INVENTION

The present disclosure relates generally to electronic systems, apparatuses, and methods, and more particularly, to systems, methods, and various other disclosures related to interactive accessing of multimedia content (videos, games, scores) wherein users may access content remotely that is being broadcasted from, or authorized to be broadcasted from a media device located at a venue, e.g. home, university, etc., to a mobile networked enabled device. System and method also includes a custom graphical user interface that user may access the multimedia content using embedded icons that become visible upon activation of the custom graphical user interface wherein the activated icons may be used to control the viewing of the multimedia content.

SUMMARY OF THE INVENTION

The present disclosure relates generally to electronic systems, apparatuses, and methods, and more particularly, to systems, methods, and various other disclosures related to interactive accessing of media content. Specifically, a system comprising of at least one processor that is part of at least one content rebroadcasting device located at a venue; and computer executable instructions executable by the computer processor and configured for causing the computer processor to receive multimedia content from at least one media device located at a venue; transmit the multimedia content to at least one mobile device; and transmit at least one custom graphical user interface or information related to the at least one custom graphical user interface to the at least one mobile device, wherein the multimedia content can be controlled for display when activated by a user input device and upon activation at least one embedded icon within a coded border becomes visible and may be engaged for controlling the review of the multimedia content pursuant to a control command corresponding to the at least one icon by selecting the at least one icon, by dragging and releasing the at least one icon in an activation area. The at least one custom graphical user interface may comprise information related to the multimedia content transmitted to the at least one mobile device. The computer executable instructions are configured to receive the at least one custom graphical user interface from at least one server.

Multimedia content as used herein includes any one or more of the following: videos, television broadcasts, sports scores, text, graphics, promotions, television commercials, radio broadcasts, print advertisements, movies, and movie trailers, and the like.

When the custom graphical user interface is activated and the embedded icons previously not visible become visible upon activation, the multimedia content may be controlled using the icons that corresponding at least one control command corresponding to the at least one embedded icon that includes any one of the following commands: display multimedia content, customize settings, display scores, and manage video. The at least one control command for displaying the multimedia content include but are not limited to any one or more of the following: remove video, change video, play, stop, fast-forward, rewind, pause, maximize viewing, minimize, end and cancel. In some embodiments, the sports access application is further configured for displaying the at least one multimedia content within the coded frame with full functionality for review and control, wherein the sports access application retrieves the at least one multimedia content by linking to at least one media device located at a venue for receipt of authorized content.

The various embodiments of systems described herein result from the realization that sports enthusiasts appreciate ready and available access to sports broadcasts and scores in a mobile society. Accordingly, the system and method provides the ability to access sports broadcasts, videos and scores based on a customized selection by the individual subscriber using interactive media.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

FIG. 4A-4I are exemplary embodiment of the custom graphical user interface according to one embodiment.

DETAILED DESCRIPTION OF PREFERRED EMBODIMENTS

Figure 1A:
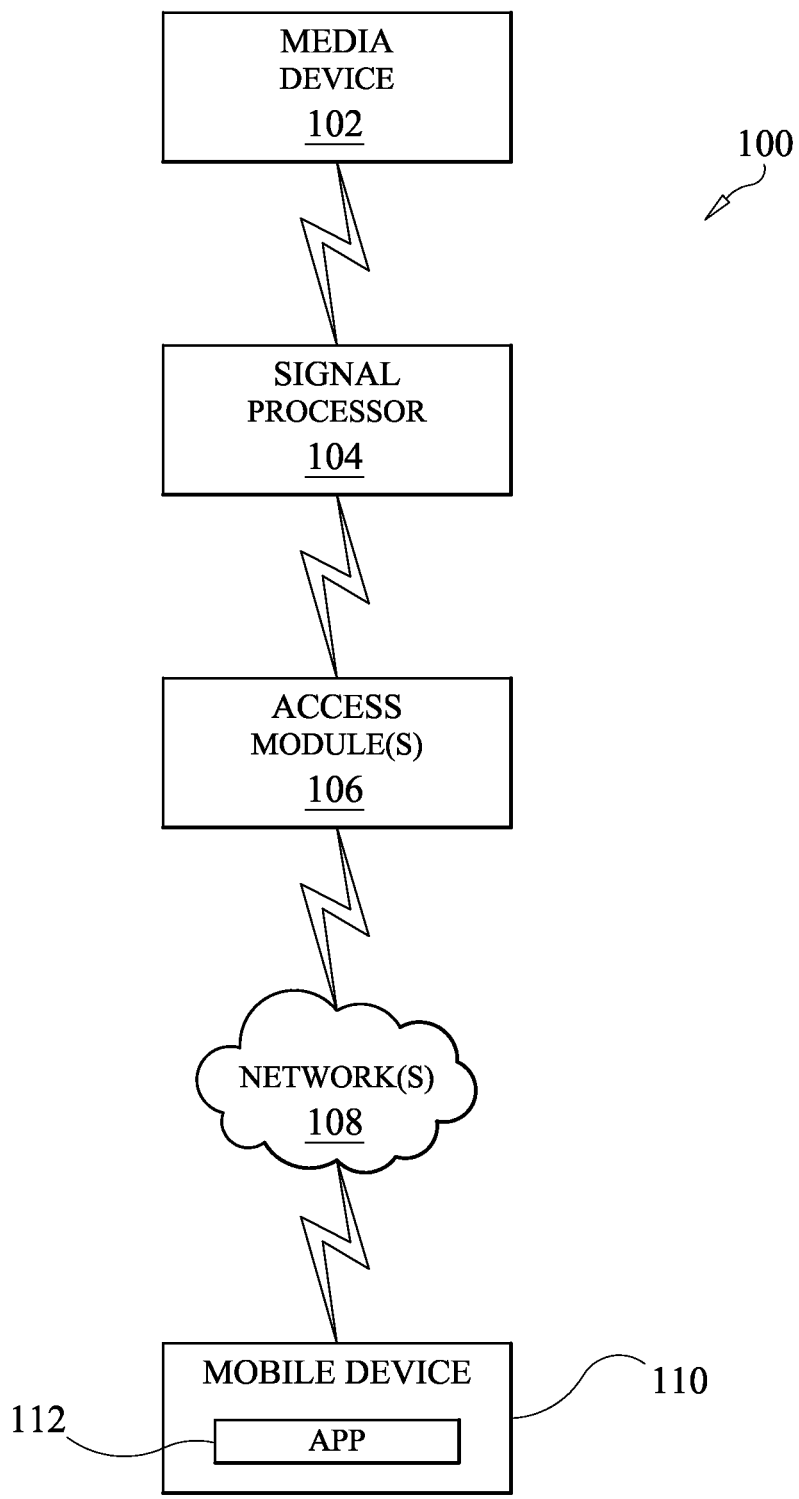
FIG. 1A-1C are exemplary embodiment of the system according to one embodiment.

The following discussion describes in detail an embodiment of the various systems and methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems & Methods

Referring now to FIG. 1A a system 100 for providing remote content to users is shown, wherein system 100 comprises at least one media device 102 having an audio output, at least one or more signal processors 104 connected to the audio output and configured to capture and transmit (or broadcast) audio (or video) being played by the media device 102, a wireless local area network ("WLAN") access module(s) or access point(s) 106 connected to the signal processor 130 and configured to establish a WLAN (s) 108, and one or more mobile devices 110 running the sports access application 112, wherein the mobile device 110 is configured to connect to the signal processor 130 via the WLAN 108 and use sports access application 112 to receive and play the audio being broadcasted by the signal processor 130.

The term "content," as used herein, may comprise any type of content, such as, but not limited to, multimedia content, which may include sports content, television content, news content, movie content, music content, and the like.

In some embodiments, the media device 102 may be any type of media device, such as, but not limited to, a set top box, such as, but not limited to, a cable television box, a satellite television box, a internet protocol television ("IPTV") set to box, a media PC, a smart TV box, a smart TV, a DVD player, a BluRay player, a FM radio, tape player, or any other audio source. In another embodiment, the media device 102 may be a television having an audio output. In general, the media device 102 may be any type of device capable of receiving media from a media provider and playing the media. The audio output may be either an analog audio output or a digital audio output. It should be noted that for simplicity, the embodiments described herein refer to an audio output, however the various systems and methods disclosed herein may be used in conjunction with audio and/or video outputs and may be used to broadcast audio and/or video content. The audio output may comprise an audio output port, such as an analog audio output port, such as an RCA port, a 3.5 mm jack, and the like. In another embodiment, the audio output may comprise a digital output port, such as an HDMI port, S/PDIF, an optical port, and the like.

In some embodiments the signal processor 130 may comprise an audio input port. The signal processor 130 may be connected to the media device 102 via a cable. The signal processor may be positioned near the media device 102, such as on top of it or behind it, or the signal processor 130 may be positioned away from the media device 102, such as in a component rack or closet. In some embodiments, the signal processor 130 may be capable of connecting to a plurality of media devices 102, and capturing and broadcasting the audio from the plurality of media devices 102. In some embodiments, a plurality of signal processors 104 may be contained in a single enclosure, which may include a plurality of signal processors 104 sharing a motherboard.

Figure 1B:
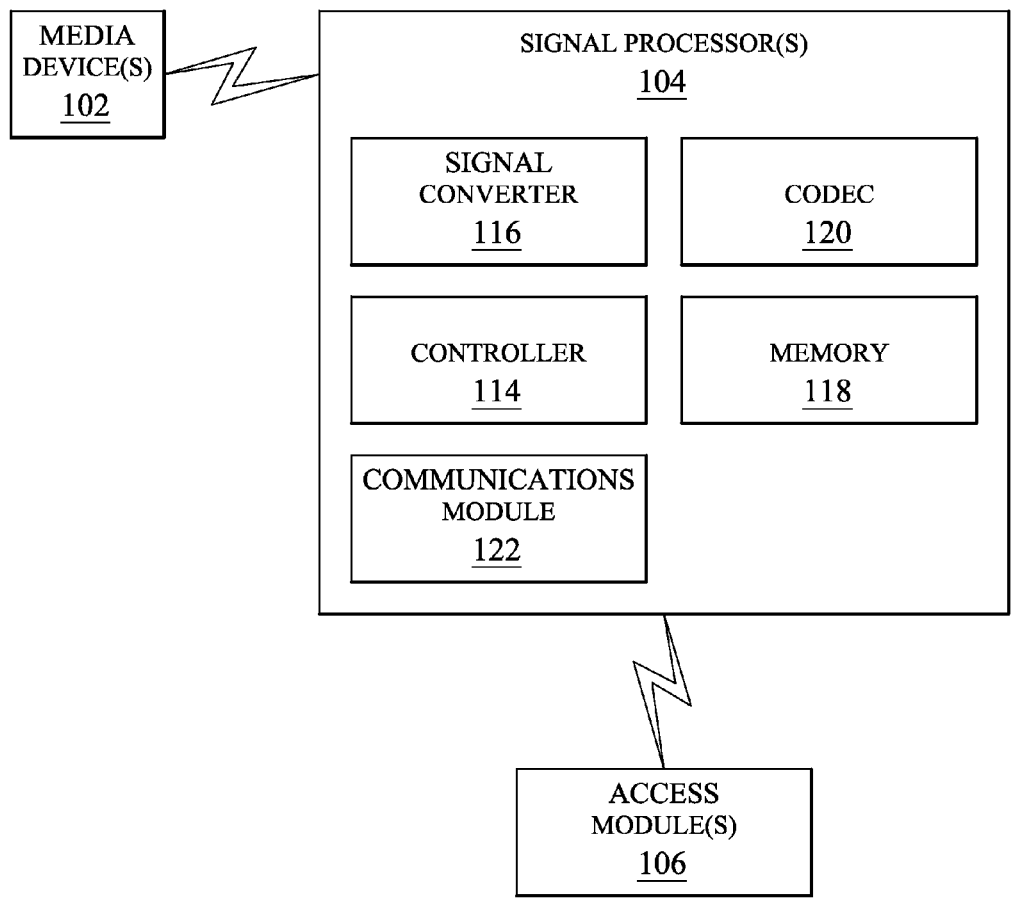

In a further embodiment, shown in FIG. 1B, the signal processor 130 may comprise a microcontroller 114, a signal converter 116 for converting an analog signal to digital signal, a memory module 118 for caching the data contained in the audio signal, an audio encoder (or codec) 120 for encoding the audio signal, and a communications module 122 for transmitting the audio signal, wherein the communications module 122 may comprise an Ethernet controller. In some embodiments, the signal processor 130 may be connected to the WLAN access module via an Ethernet cable.

The signal processor 130 may be configured to capture the audio from the media device 102, convert the audio if necessary (from analog to digital), encode the audio into any type of format, such as MPEG, pulse-code modulation ("PCM"), and the like, and transmit/broadcast the audio via internet protocol ("IP"). Accordingly, each signal processor 130 or each audio broadcast may be associated with a particular IP address. The IP address may be accessed only via the WLAN 108. In some embodiments, the signal processor 130 and the mobile device 110 may be connected using real-time transport protocol ("RTP").

In some embodiments, the signal processor 130 may be connected to a remote server (not shown), which may provide additional content to be provided to the mobile devices, such as advertising, music, custom graphical user interfaces, and the like.

In some embodiments, the WLAN access module 106 may comprise a router connected to wireless access point. In other embodiments, the WLAN access module may comprise a WLAN router, which may comprise an access point and router integrated into a single unit. The WLAN access module 106 may comprise a plurality of antennas positioned throughout a venue, such as a restaurant, bar, airport, hotel, hospital, and the like. In another embodiment, the system may comprise a plurality of WLAN access modules 106, wherein said plurality of WLAN access modules 106 may be located at or throughout a venue. In yet another embodiment, the WLAN access module 106 may comprise a plurality of routers, a plurality of WAPs, and a plurality of antennas. In yet another embodiment, the WLAN access module 106 may comprise at least one router connected to at least one WAP, wherein the WAP comprises at least one antenna. The WLAN access module 106 may be configured to establish a WLAN, to which the mobile devices 110 may connect.

Figure 1C:
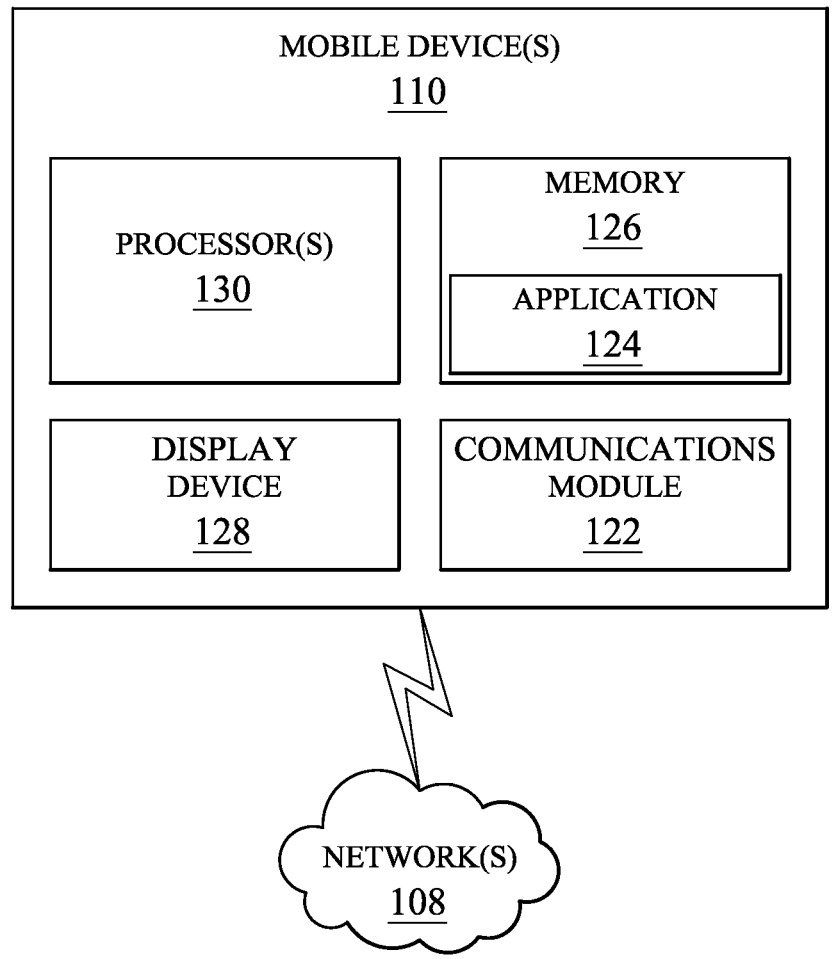

In some embodiments, the mobile device 110 may comprise any type of mobile device, such as a cellphone, a tablet PC, a handheld PC, a smartphone, a PC, a laptop, a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of electronic network device that may communicate over a network and access the audiovisual broadcast. Accordingly, as shown in FIG. 1C, the mobile device 110 may comprise audio play back software, such as a mobile application 112, a communications module 122 configured to connect to the WLAN 108, memory 126, a display device 128, a processor 130, and the like.

Mobile device 110 may include various hardware components, e.g. a computer central processor 130, memory 126, and one or more communication module 122. In some embodiments, computer processor 130 may comprise any type of processor, such as, but not limited to, a single core processor, a multi core processor, a server processor, central processing unit (CPU), a microprocessor, microcontroller 114, a video processor, a front end processor, a coprocessor, a single-core processor, a multi-core processor, and the like. In some embodiments, processor 130 may be connected to, part of, or integrated with at least one content rebroadcasting device. The content rebroadcasting device may comprise a signal processor, such as signal processor 104 as described above with reference to various figures. Computer processor 130 may be programmed to activate a sports access application ("sports access app") 112 for controlling multimedia content, which may be controlled from the mobile device's displaying device 128.

In some embodiments, mobile device 110 may have one or more icons 132, 132' or other visual indicators displayed thereon that allows user to launch and access the sports access app 112 associated with its icon 132. When a user selects the icon 132 with a user input device (e.g. by touching a touch-screen, or selecting it using a pointing device, roller ball, arrow keys, or other controller), the user may access the sports access app 112.

Mobile device 110 is equipped with communication module 122 either electrically or mechanically connected to processor 130. In the case of electronic connections, the electronic connections may be wired and/or wireless. In some embodiments, communication module 122 may be a wireless communication module 122, which employ short range wireless protocol, such as, but not limited to, a radio frequency transceiver, a radio frequency receiver, and/or a radio frequency transmitter. In embodiments where the wireless communication module 122 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication module 122 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication module 122 are operative to transmit or receive electronic communications, i.e. commands and the like, via a short range wireless protocol, such as, but not limited to, a radio frequency receiver, a radio frequency transmitter, or a radio frequency transceiver. In some embodiments, mobile device 110 also includes a speaker 120 for broadcasting audio.

The memory 126 is either electrically or mechanically connected to the at least one computer processor 130. In the case of electronic connections, the electronic connections may be wired and/or wireless connections. Memory 126 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. The information stored thereon may be retrieved from memory 126 using the computer processor 130.

Computer processor 130 positioned within the mobile device 110 includes computer executable instructions, where the computer executable instructions are operative to perform all the necessary functions for the system 100 and methods disclosed herein, including but not limited to launching the sports access app 112. Computer executable instructions may be stored on a non-transitory computer readable medium, such as a memory module, a hard drive, flash memory, a removable computer readable medium, and the like, wherein said non-transitory computer readable medium may be connected to or in communication with processor 114. Non-transitory computer readable medium may include but is not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer application program, the program being composed in any suitable programming language or source code, such as C++, C, JAVA, JavaScript, HTML, XML, and other programming languages.

Mobile device 110 may include any kind of displaying device 128, such as, but not limited to: a liquid crystal display ("LCD") screen, a light emitting diode ("LED") display, touchpad or touch screen display, and/or any other means known in the arts for emitting a visually perceptible output. Mobile device's processor 130 is in electronic communication with its displaying device 128. In other embodiments, displaying device 128 is wirelessly connected to processor 130. Displaying device 128 may include a control means, such as, but not limited to, a touch screen, a stylus, and the like. In some embodiments, displaying device 128 may be electronically connected to a mobile device 110 according to the hardware and software protocols that are known and used in the arts. Computer central processor 130 controls the mobile device's displaying device 128, which is configured for displaying multimedia content, and the like.

Mobile device 110 also includes software components that may be stored in the memory 126. Memory 126 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile device 110. Mobile device 110 may also contain an input element for inputting data and an output element for displaying data.

Also stored on the memory 126 may be an operating system, an application manager, and the sports access app 112. Sports access app 112 may be an independent component or may be incorporated into the operating system 124, such as iOS™, Android™, Windows Mobile™, Blackberry™, and the like.

Application manager comprise of computer-executable components that operate in mobile device 110 and may be implemented in a variety of ways. In one embodiment of the invention, application manager may use one or more computer-executable components for interacting with sports access app 112. In another embodiment, sports access app 112 is incorporated in application manager to receive information from the input element, to communicate with, and/or to control the operations of sports access app 112.

Sports access app 112 may comprise in part of a browser, such as for use on the mobile device 110, or a similar browsing device. Sports access app 112 may be any type of software application, such as a standalone application designed to run on a mobile platform, such as a mobile device running an operating system 124, and the like. Sports access app 112 may be operative for an iPhone, any other "smart phone," mobile device, cellular phone, PDA, GPS or any other mobile device 110 capable of handling electronic transactions dealing with dynamic content, object, application, or software. In some embodiments, the sports access app 112 may be designed to run on a social network platform, such as FACEBOOK™ or JUSTSYNC™. In some embodiments, sports access app 112 may reside on a server computer and may be downloadable from the computer server or otherwise reside in the mobile device's local memory 126. For example, in one embodiment, the sports access app 112 may be on a mobile device 110 (such as an iPhone, Blackberry, or other "smart phone") and the full-sized software program may be on a remote computer server, where communications may occur over directly over a network 108, e.g. local area network, wide area network such as the Internet 108.

Sports access app 112 is a computer-executable component readable and executable by the computer processor 130, wherein the sports access app 112 searches a plurality of media 112, e.g. cable, SMS text messages, radio, television, email, Internet and the like for at least one search result 126 based on the subscriber's search criteria 114, where once the search result 126 is attained, it may be channeled and displayed and/or published in audio, video, pictorial, text message, graph or an alert on the mobile device 110.

In some embodiments, the mobile device 110 may comprise any type of mobile device, such as a cellphone, a tablet PC, a handheld PC, a smartphone, a PC, a laptop, or any other type of electronic device capable of connecting to the WLAN and accessing an audio or audiovisual broadcast or scores 134' from a home video broadcast, which may include for instance a sports broadcast. Accordingly, the mobile device 110 may comprise audio play back software, such as a mobile application 112, a communications module 122 configured to connect to the WLAN, memory 126, a display device 128, a processor 130, and the like.

In either embodiment, computer executable instructions readable by processor 130, (i.e. the server's computer processor 130' or the mobile device's processor 130) are operative for launching the sports access app 112 for controlling different multimedia content received from one central location, e.g. a home cable box, a set top box, a television receiver and the like.

In yet another embodiment, system 100 may further comprise of computer executable instructions readable by processor 130 and operative to perform the system 100 and methods disclosed herein. The computer executable instructions may be loaded directly on the processor 130, or may be stored in a memory 126, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In some embodiments, sports access application 112 may comprise a set of computer executable instructions that are stored on the memory 128 of the mobile device 110. In another embodiment, sports access application 112 may comprise a set of computer executable instructions that are stored on a server and accessed by the mobile device 110.

Sports access application 112 may be configured to connect to the signal processor 104 via the WLAN 106 and WLAN access module 106, receive or access the audio broadcast, decode the audio signal, and play the audio content via an audio playing means on the mobile device 110 (e.g. speaker or headphones). In some embodiments, sports access application 112 may be configured to present a graphical user interface (GUI) on the mobile device 110, wherein user input and criteria may be solicited and content may be displayed responsive to the selected criteria, wherein content may be any type of content, such as advertising, content being played by the media device 102, content received from a server, sports content, news content, television content, user generated content, and the like, where sports access application 112 may be configured to automatically connect to the WLAN 108.

Once connected to the WLAN 108, sports access application 112 may be configured to present a user with options to choose which broadcast is to be streamed. For example, during baseball season several baseball games are being broadcasted simultaneously that may be viewed at home via the media device 102 on different channels. User may be able select which broadcast he/she wants to view.

In some embodiments, the system 100 may be configured to use the signal processor 104 to capture an image(s) being presented on the media device(s), and push the image(s) to sports access application 112 (e.g. to populate menu options with images of the content being played by the respective media device) so that the user can select the broadcasted content of their choice. In some embodiments, the image may be received from a remote server, wherein said remote server may be connected to the signal processor 104 via a wide area network, such as the internet.

In yet another embodiment, sports access application 112 may be configured to present advertisements to a user, wherein said advertisements may be for products/services available at the venue that they are in. Sports access application 112 may be configured to determine a location of the mobile device 110 by using a location determination device, such as the mobile device 110's GPS module, or by calculating the location based on WLAN positioning, IP address, or cellular phone tower triangulation. In yet another embodiment, if a product or service is being advertised in the content being played by the media device 102, or in an another advertisement being presented on the mobile application 112, the user may be presented with the option to purchase said advertised product or service using their mobile device 110. In yet another embodiment, if a product or service that is advertised in the content being played by the media device 102, or another advertisement being presented on the mobile application 112, and said product or service is available for purchase at the venue, the user may be presented with the option to purchase said advertised product or service, and once purchased, the venue may be notified that the user has purchased said advertised product or service so that an employee of the venue may bring the user the purchased product or service.

In yet another embodiment, sports access application 112 may be configured to present the user with a menu, such as a restaurant and bar menu, and may be configured to allow users to order items on the menu via sports access application 112. Accordingly, the system 100 may feature an order processing module whereby orders placed using the app may be presented to waiters. The order processing module may be connected to the WLAN 108 as well.

In yet another embodiment, sports access application 112 may feature a social media feature, wherein users at a location may be able to interact such as by posting status updates, via user profiles, by sending messages to each other, and by ordering menu items for each other. In yet another embodiment, sports access application 112 may be configured to allow users to pay for purchased products or services (e.g. menu items) via their mobile device 124. In another embodiment, sports access application 112 may be configured to interface with a third party social network, such as FACEBOOK™, TWITTER™, LINKEDIN™, OR JUSTSYNC™, and social media updates/messages may be shared between sports access application 112 and said third party social networks.

In another embodiment, sports access application 112 may be configured to present users with advertising when the television goes to programming, and, more specifically, sports access application 112 may be configured to usurp advertising that is being played by the media device 102 with advertising that is provided via the signal processor 104, wherein said advertising may be custom advertising for the venue or other providers.

In one embodiment, sports access application 112 may be configured to present a skin or theme in the GUI based on the venue. The skin or theme may be determined by identifying which WLAN access module 106 the mobile device 110 is connected to, or by location determination methods and devices, as described above.

In yet another embodiment, sports access application 112 may be configured to create a geo-fence, such as by using a GPS or WLAN positioning system module in the mobile device 110, or by other location determination means (as described above), wherein if a user goes out of the geofence, they will no longer be authorized to access the audio broadcast via the WLAN 108. The geofencing function may also be accomplished by limiting access to the audio broadcast to those mobile devices 110 running sports access application 112 and connected to the WLAN 108. Thus, users will not be able to receive the audio broadcast unless they are connected to the WLAN 108, and the WLAN 108's coverage may be limited to the venues that are playing the content whose audio is being broadcasted by the system 100. In some jurisdictions, rebroadcasting content to users may comprise copyright violation, unless said users are authorized to receive, view, or hear said content. In most cases, patrons of a venue are authorized to receive, view, and heard content being played at the venue. By geo-fencing users to locations where they are authorized to receive, view, or hear the content, the systems and methods described herein may be operated and performed in a legal manner and without violating copyright law.

In yet another embodiment, sports access application 112 may be configured to allow important alerts or messages to be transmitted to mobile devices 110, wherein emergencies may be announced (such as a fire and the like), or special deals at the venue may be announced.

In yet another embodiment, sports access application 112 may be configured to prompt a user for a password to access the WLAN 108, the audiovisual broadcast, or both. The password may be provided by the venue to the user or is a user selected password.

In yet another embodiment, sports access application 112 may be downloaded by user by providing user with a hyperlink to download sports access application 112. Sports access application 112 may be provided via an online application store, such as Google Play™, Apple App Store™, via a website, or locally, via the WLAN 108. In yet another embodiment the system 108 may comprise a physical object positioned in or near the venue, wherein the physical object may have a link on it, and wherein the physical object may comprise, but is not limited to, placards, posters, stickers, table tents, table cards, menus, window stickers, and the like, and may be presented in or near the venues with links to download the application. The link may comprise a scannable code, such as a quick-read code ("QR code") or a coded frames with embedded code and content, which may be scanned by the mobile device 110 (using a camera on the mobile device 110) and used to download sports access application 112.

In yet another embodiment, if a user opens sports access application 112 and the WLAN 108 is not available, sports access application 112 may be configured to determine a location of the mobile device 110 (using the location determination means described herein), and present the user with information regarding the locations of available WLAN(s) 108 (or venue with the nearest WLAN 108 or system 100), which may include the nearest WLAN 108. In a further embodiment, sports access application 112 may be configured to present the user with directions on how to get to the WLAN 108, or venue with the WLAN 108 or system 100, wherein said directions may comprise a map, written directions, step-by-step directions, and the like.

Figure 2:
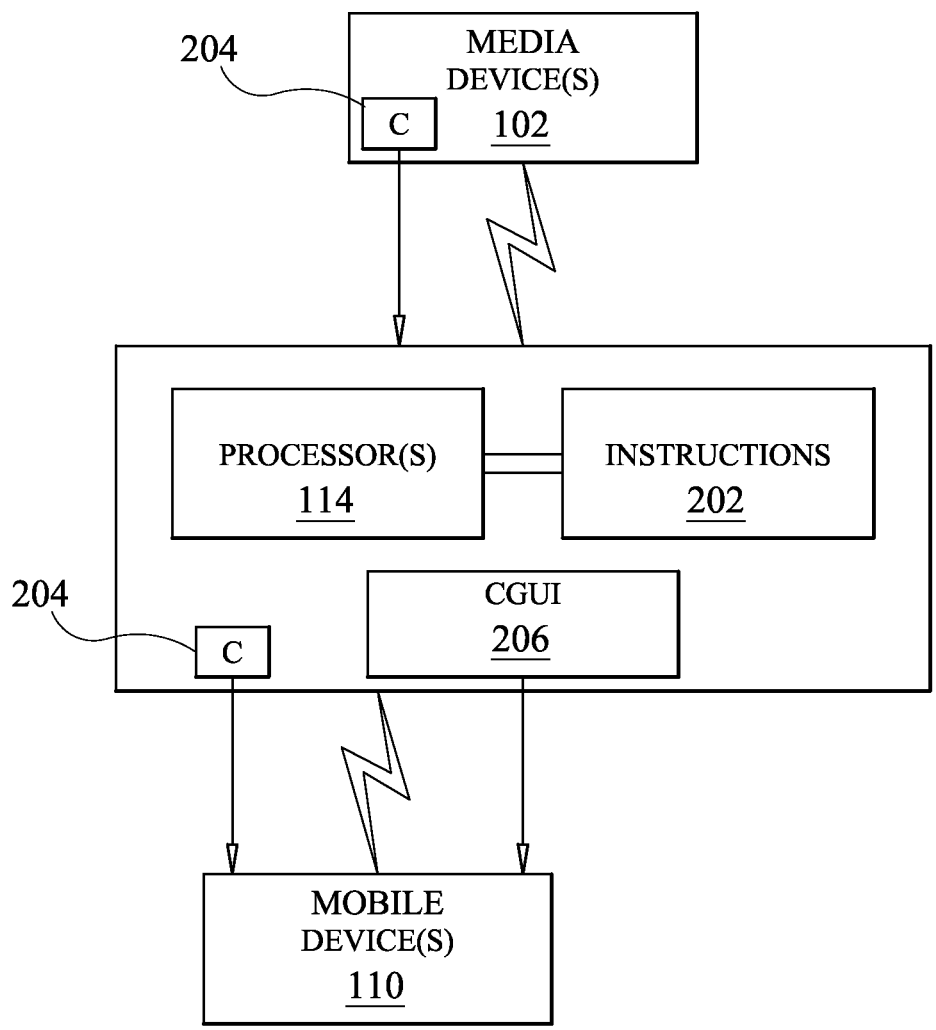
FIG. 2 is an exemplary embodiment of the system according to one embodiment.

Referring now to FIG. 2, a system 200 is shown in accordance with one embodiment, wherein system 200 may comprise at least one processor 114 and computer executable instructions 202 readable by processor 114 and configured to receive audio and/or video content 204 ("content") from at least one media device 102 at a venue, transmit content 204 to at least one mobile device 110, and transmit at least one custom graphical user interface 206 ("CGUI") or information related to CGUI 206 to mobile device 110.

In some embodiments, processor 114 may be connected to, part of, or integrated with at least one content rebroadcasting device. The content rebroadcasting device may comprise a signal processor, such as signal processor 104, described above with reference to FIGS. 1A-1C.

In some embodiments, computer executable instructions 202 may comprise any type of computer executable instructions, such as a computer application, which may be encoded in any computer language. Computer executable instructions 202 may be stored on a transitory or non-transitory computer readable medium, such as a memory module, a hard drive, flash memory, a removable computer readable medium, and the like, wherein said computer readable medium may be connected to or in communication with processor 114.

Accordingly, in some embodiments, mobile device 110 may be connected to processor 114 via a WLAN and a WLAN access module, such as network 108 and access module 106, described above with reference to FIGS. 1A-1C.

Figure 3A:
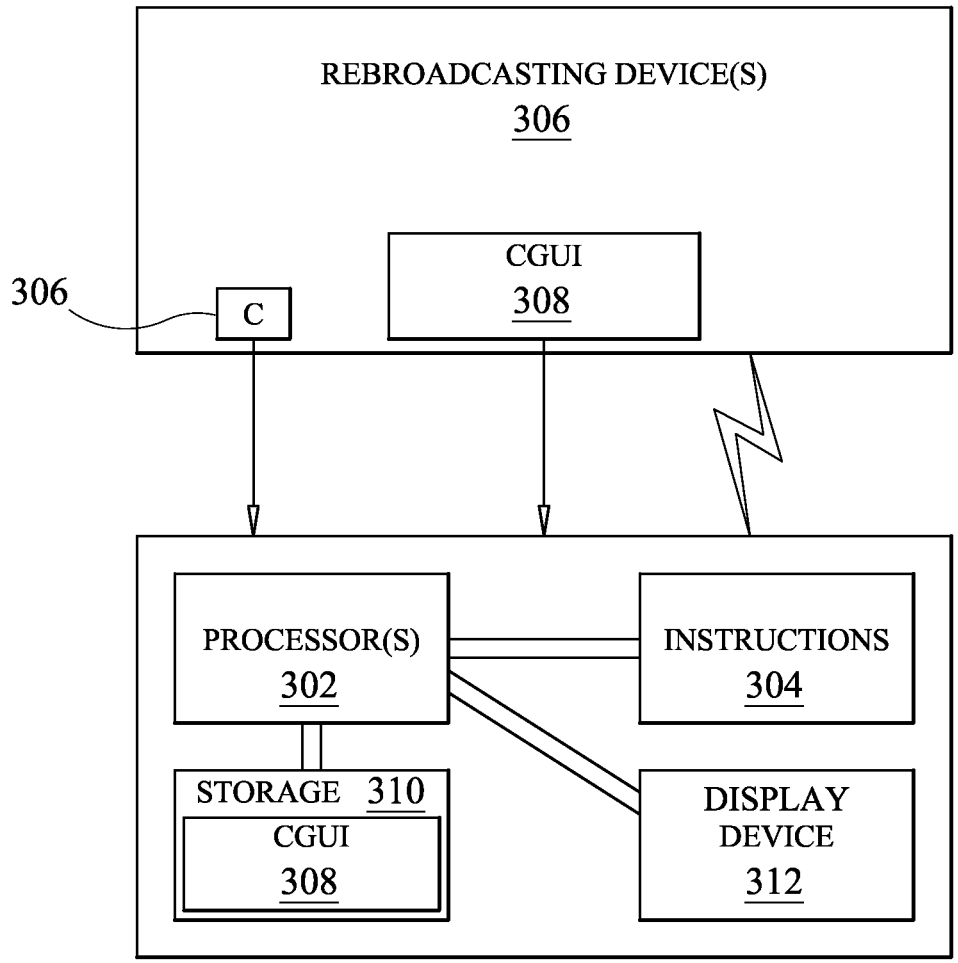
FIG. 3A is an exemplary embodiment of the system of the invention.

FIG. 3A is an exemplary embodiment of the system 300 of the invention. System 300 may comprise at least one processor 302 and computer executable instructions 304 readable by processor 302 and configured to receive multimedia content 402 (text, graphs, audio and/or video content ("content") from at least one content rebroadcasting device 306 located at a remote venue, e.g. home, university, schools, etc., receive at least one custom graphical user interface ("CGUI") 308 from the at least one content rebroadcasting device 306, or select at least one CGUI 308 stored on a storage module 310 connected to processor 302, and display the CGUI 308 on a display device 312 connected to processor 302.

In some embodiments, processor 302 may comprise any type of processor, such as, but not limited to, a single core processor, a multi core processor, a server processor, and described above with reference to FIGS. 1A-2B. In some embodiments, processor 302 may be connected to, part of, or integrated with at least one mobile device 124. Mobile device 124 may comprise any type of mobile device, such mobile device 110, described above with reference to FIGS. 1A-2B.

In some embodiments, computer executable instructions 304 may comprise any type of computer executable instructions, such as a computer application, which may be encoded in any computer language. Computer executable instructions 304 may be stored on a transitory or non-transitory computer readable medium, such as a memory module, a hard drive, flash memory, a removable computer readable medium, and the like, wherein said computer readable medium may be connected to or in communication with processor 302. In some embodiments, computer executable instructions 302 may comprise a mobile application, such as, but not limited to, a downloadable mobile application.

In some embodiments, at least one content rebroadcasting device 306 may comprise any type of content rebroadcasting device, such as signal processor 104, described above with reference to FIGS. 1A-1C, and at least one processor 130 described above with reference to FIGS. 2A and 2B. Accordingly, in some embodiments, processor 302 may be connected to rebroadcasting device 306 via a WLAN and a WLAN access module, such as network 108 and access module 106, described above with reference to FIGS. 1A-1C.

FIG. 4A-4I are exemplary embodiments of the CGUI 308 according to one embodiment. CGUI 308 may comprise virtual buttons and entry fields. In some embodiments, computer executable instructions 304 may be operative to receive CGUI 308 from a server, such as a remote server. CGUI 308 may be received via a wide area network, such as the internet.

In some embodiments, the processor 114 is configured for engaging the mobile device's 110 communication module 122 to transmit the at least one CGUI 308 or information related to the CGUI 308 to the at least one mobile device 110 wherein the multimedia content 400 can be controlled for display when activated by a user input device. User input device may comprise of any type of user input device, such as a touch screen, a button, a keypad, a gesture control device, and the like. In some embodiments access to the CGUI 308 requires registration of the mobile device 110, user name and/or user's cable service provider as the user's authority to access the content remotely on his/her mobile device 100 may be directly linked to authorized broadcasts streamed by the service provider to the media device 102 at a remote location, e.g. at home.

Figure 4B:
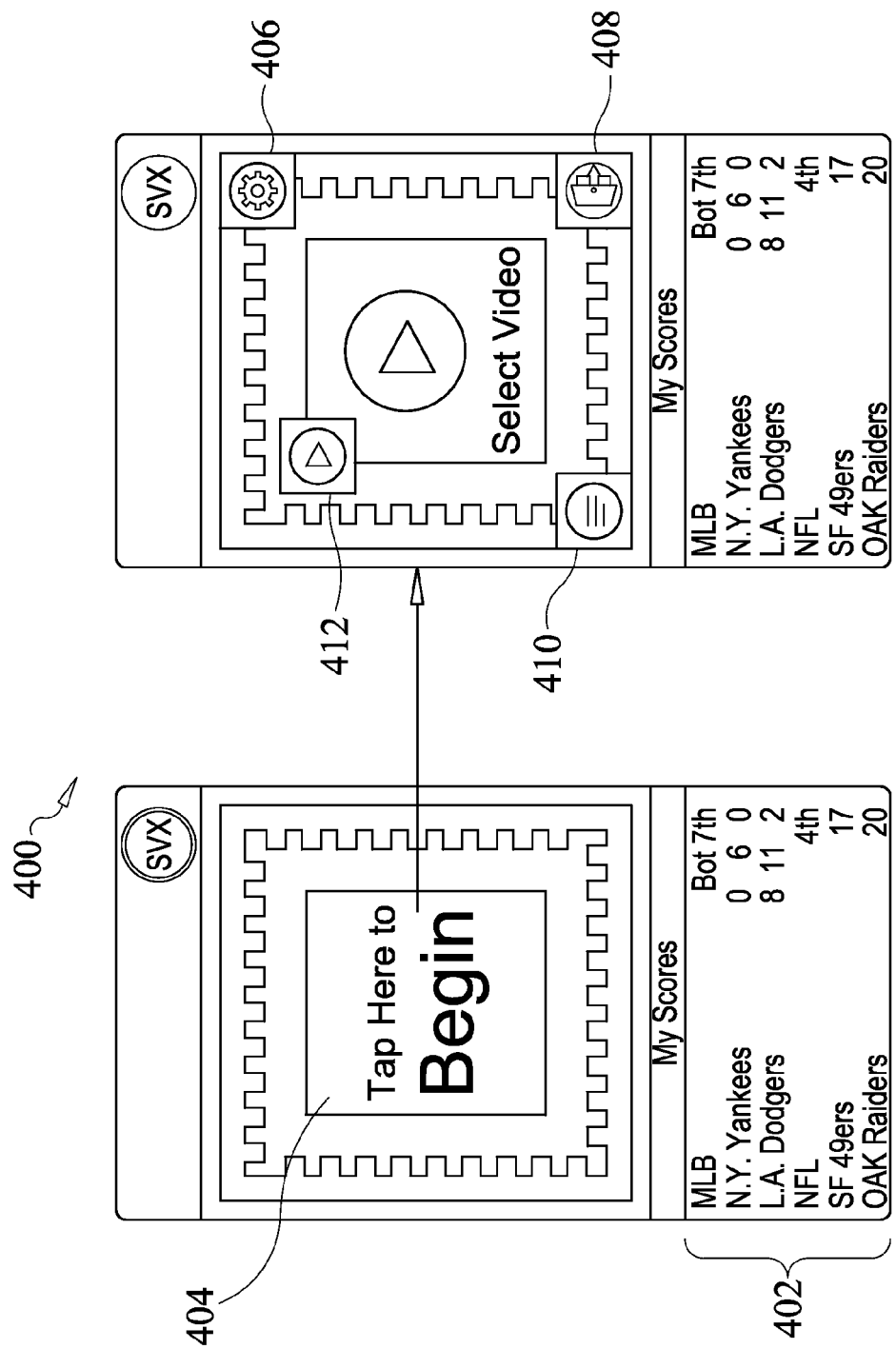

In some embodiments of the invention, multimedia content, (e.g. text, graphics, audio, videos, and the like) may be readily viewable once the CGUI 308 is activated as shown in FIG. 4A wherein the multimedia content 402, e.g. scores from user's Favorite teams as identified in Settings, are readily visible once the login process is completed. The CGUI 308 may be further activated to access the remote multimedia content 402 that is being transmitted form the media device 102 by using his/her input device to engage an activation area 404 that causes the activation of the at least one or more embedded icons 406, 408, 410, 412, within a coded border (as shown in FIG. 4B), becomes visible and may be engaged for controlling the review of the multimedia content 402 pursuant to a control command corresponding to the at least one icon 414 by selecting the at least one icon 414 for the chosen activity, dragging and releasing the at least one icon 414 into the activation area 404.

Figure 4C:
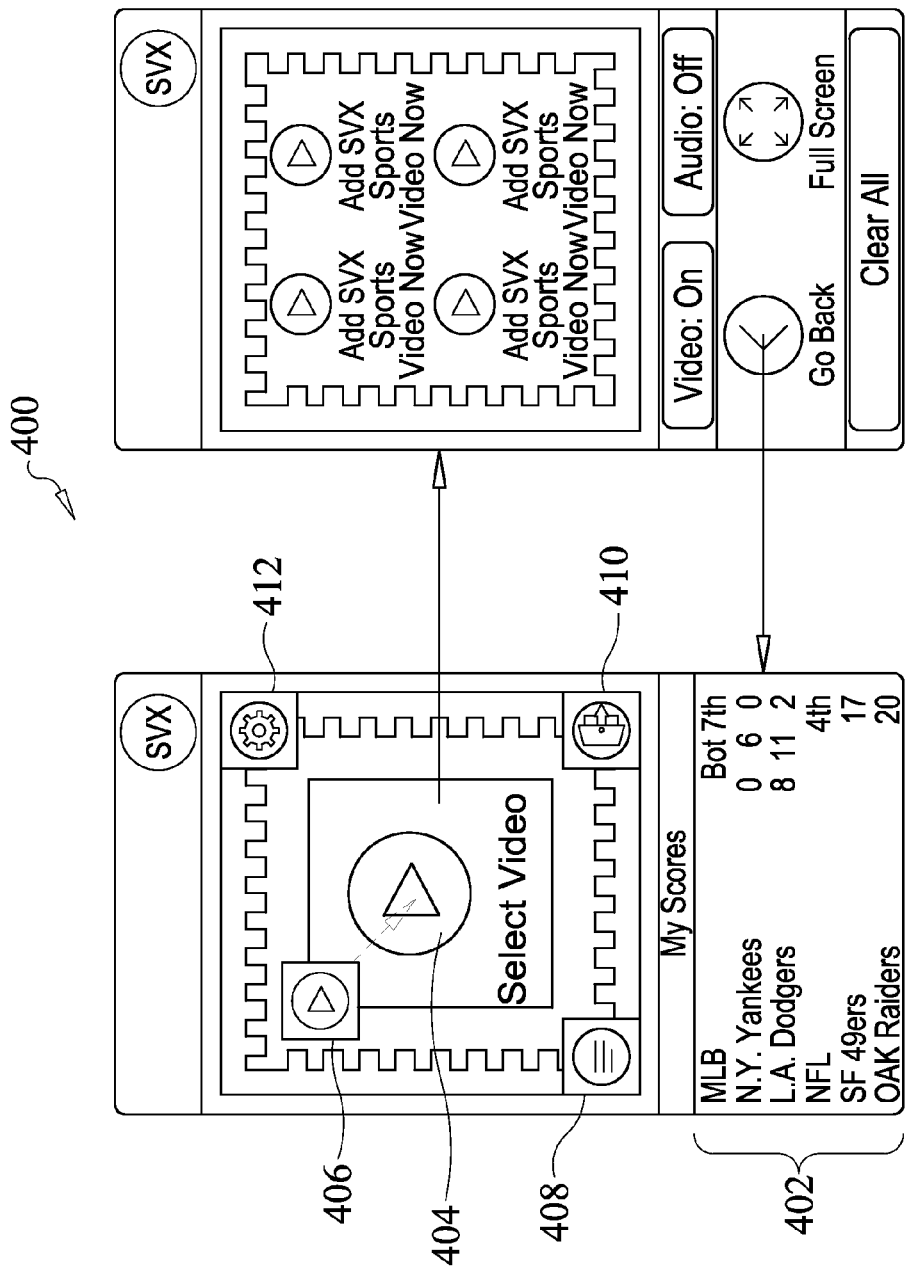

Once connected to the WLAN 108, sports access application 112 may be configured to present a user with the opportunity to tune into an audio stream from a select video broadcast corresponding to multimedia broadcasts that would've been accessible to be viewed from home or as per a subscription for the mobile sports access application 112. For example, as shown in FIGS. 4A-4C, user may access sports access application 112 by clicking on an icon 406, which provides an activation area 404 to begin activation of interactive action icons 406, 408, 410, 412 to their "on" state. By tapping on the activation area 404, the interactive action icons 406, 408, 410, 412 become visible and user may select content, e.g. a select video broadcast to be played.

Referring to FIG. 4C, user may view an exemplary multimedia content 402, (e.g. sports video) by using his/her input device tapping or holding the desired icon 406 which may cause the visible display of the corresponding control command in the activation area 404 for the action to be executed. By tapping or holding the desired icon 406, dragging and releasing the at least one icon 406 into the activation area 404 user may then select multimedia content 402 for viewing. In some embodiments a plurality of multimedia content 402 may be displayed concurrently using picture in picture technology. In some embodiments, the multimedia content 402 may be controlled using additional control commands, e.g. GO BACK or FULL SCREEN mode that become evident when the various icons 406, 408, 410, 412 are activated. For example, the "CLEAR ALL" virtual radio button is only active when one or more videos are playing, but otherwise the radio button is inactive.

Figure 4D:
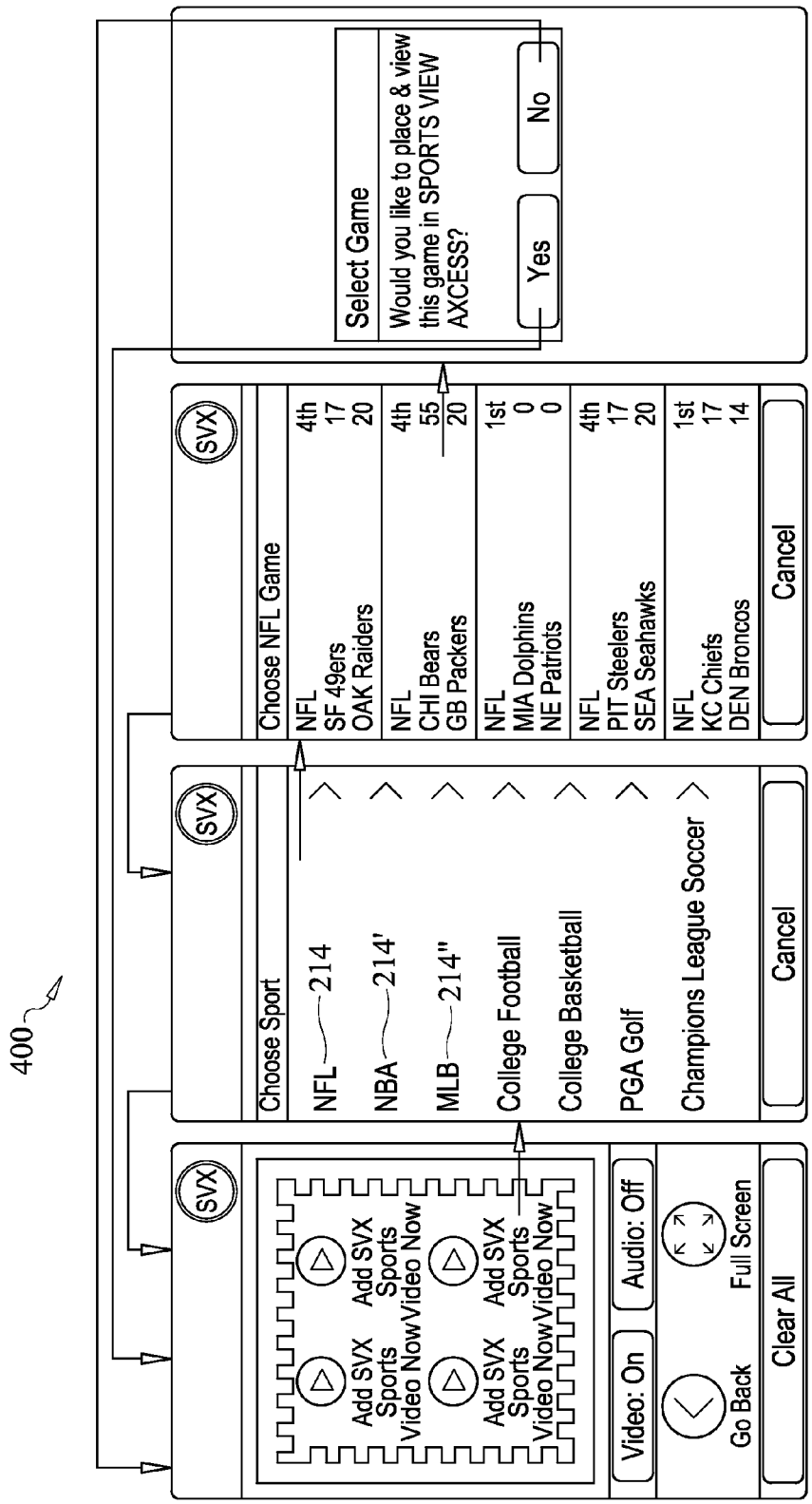

In another embodiment, CGUI 308 may comprise information related to multimedia content 402, such as available content channels, programming selections, scheduled times of play, time left in program, screen shots of content 402 (as described above), and the like as shown in FIG. 4D. The user may be able select which video broadcast 402 is to be viewed. As shown in FIG. 4D, user may select for instance the overall sports categories that they desire to watch, professional football, basketball, baseball, college football, golf and the like. User may select any broadcast (live or videotaped) that may currently be in progress or previously taped that is available to user via specified selections via subscription to the system 100, 200 and method disclosed herein or via a home media subscription service. In some embodiments, user is provided with a confirmation for the selection of the broadcast to be aired.

Computer executable instructions 304 may be configured to use the mobile device 110 to broadcast multimedia content 402, wherein the audio or video broadcasting device may comprise display device 312, speakers, or audio headphones connected to processor 302. For example, user may access various broadcasted programming to be viewed on the mobile device 110. By selecting the icon 406 for viewing a video, user may be transported to a screen selection for a sports category that he/she desires to view and thereafter further select games being broadcasted that user is authorized to view. In some embodiments, confirmation may be required to fully allow the media content 402 to be broadcasted.

Figure 4E:
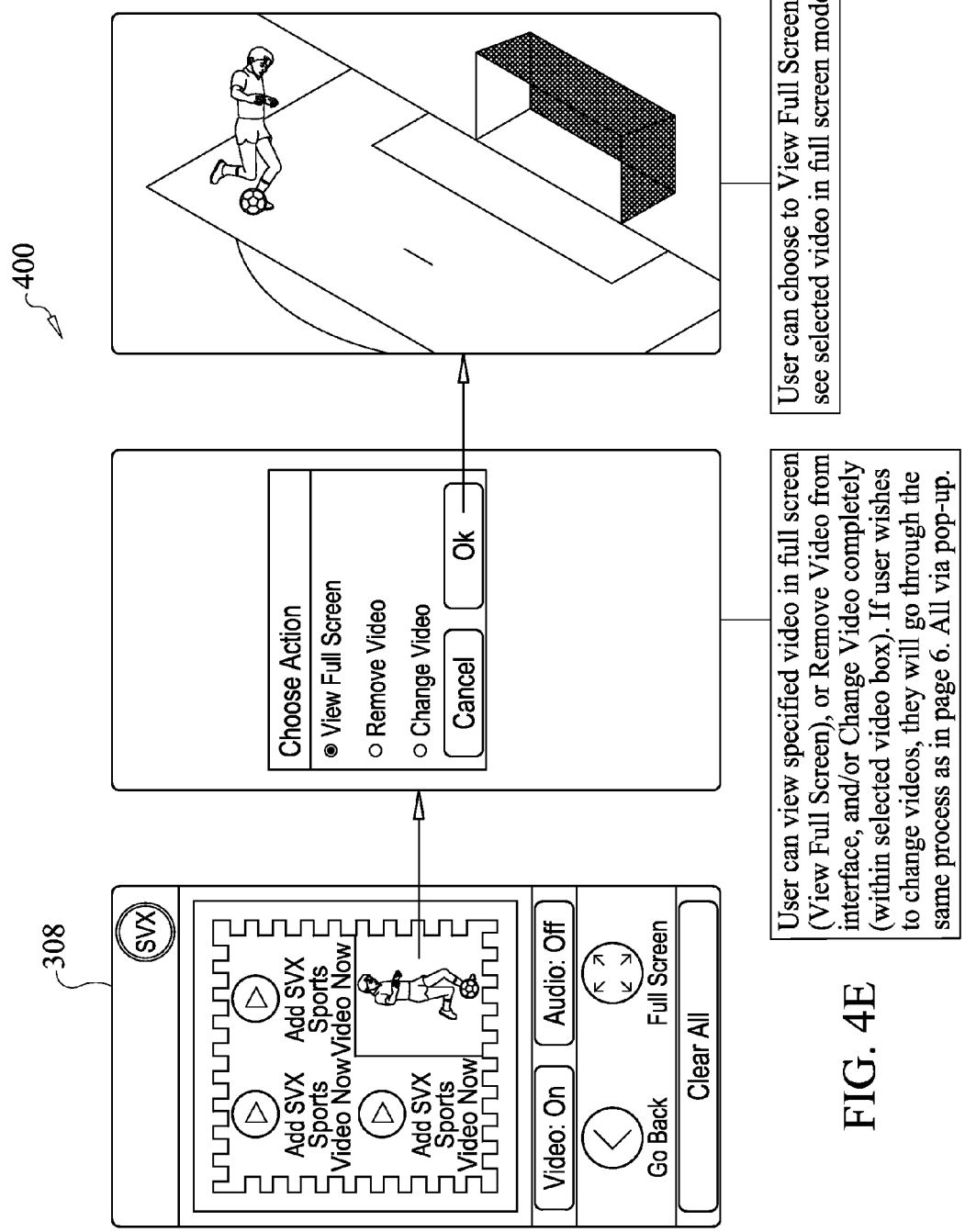

The sports access application 112 has user friendly features to simplify and/or enhance the viewing experience. As previously mentioned, user may control the viewing of the multimedia content 402 with the icons as well as additional control commands that may be displayed by the CUI 308. As shown in FIG. 4E, user may long tap each video selection to view options that include but are not limited to: "View Full Screen, Remove Video, Change Video, Clear All" as well as those options that are well known and used in the arts.

As shown in FIG. 4F, user may further control a plurality of videos 402, 402' playing simultaneously. For example, user may long tap each video selection to view options that include but are not limited to: "View Full Screen, Remove Video, Change Video, or toggle between videos 402, 402' and or the Audio On/Off radio buttons. In some embodiments, user may use the "GO BACK" button to simply return to Home screen, or "Clear All" to remove all current videos 402, 402' being played.

FIG. 4G shows an exemplary embodiment of the system 400 of the invention. User may customize the experience by customizing the settings for his/her use of the CGUI 305. Using the user input device user may drag and release the icon 408 (for Settings) into the activation area 404 to execute the action, from which user may enter registration information 414, e.g. name, password, telephone number and the like. User may also select his/her preferences, e.g. the teams for which he/she wants to receive multimedia content 402 (e.g. multimedia broadcasts, videos or scores) as well as how to manage content sources 304. For example, user may select their favorite teams which may be supplied with the sports access application 112 as well as having the ability to synchronize and manage where the actual multimedia content 402 is coming from, e.g. synching to cable provider, a set-top box or otherwise.

Figure 4H:
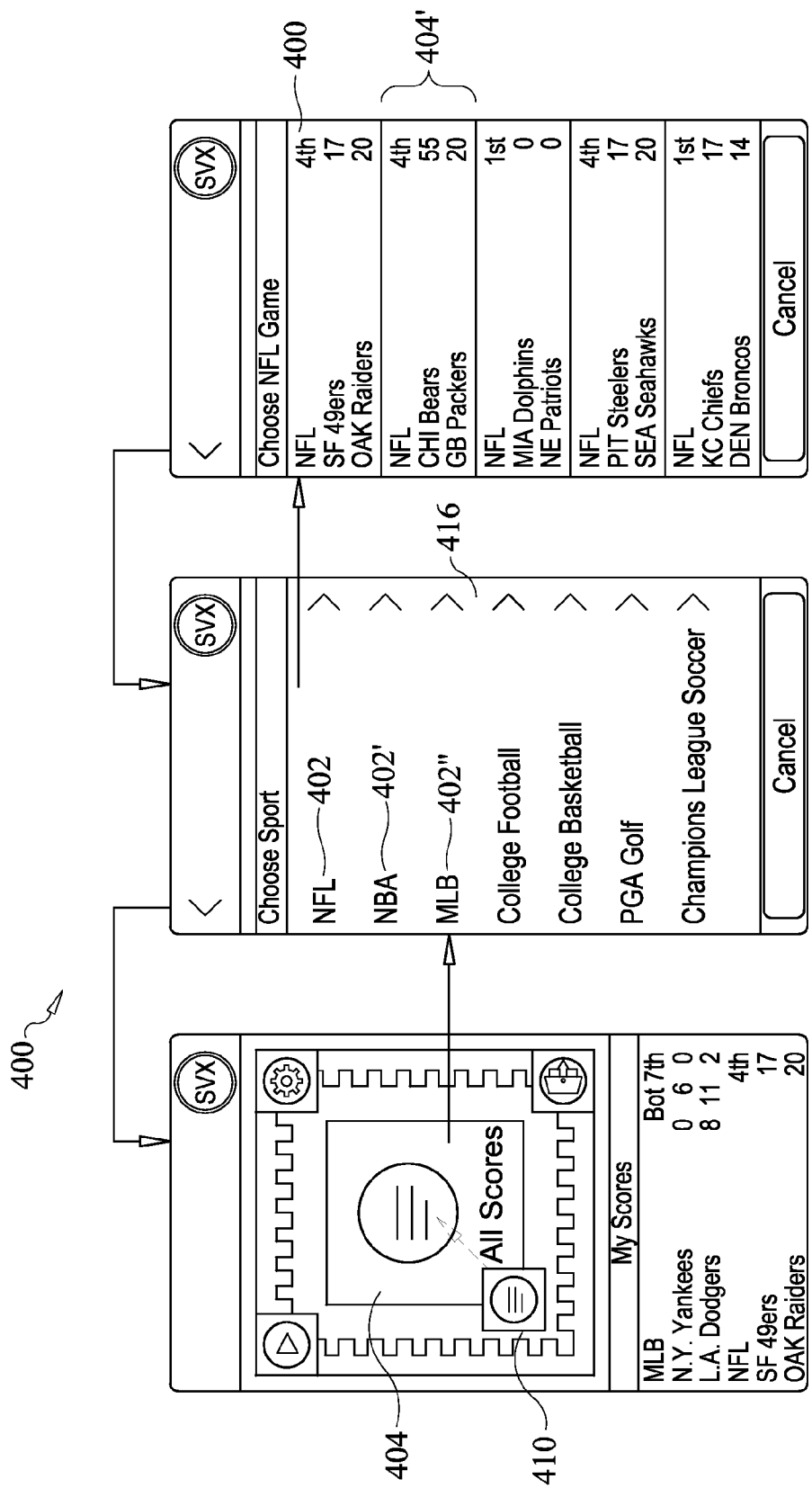
Figure 4I:
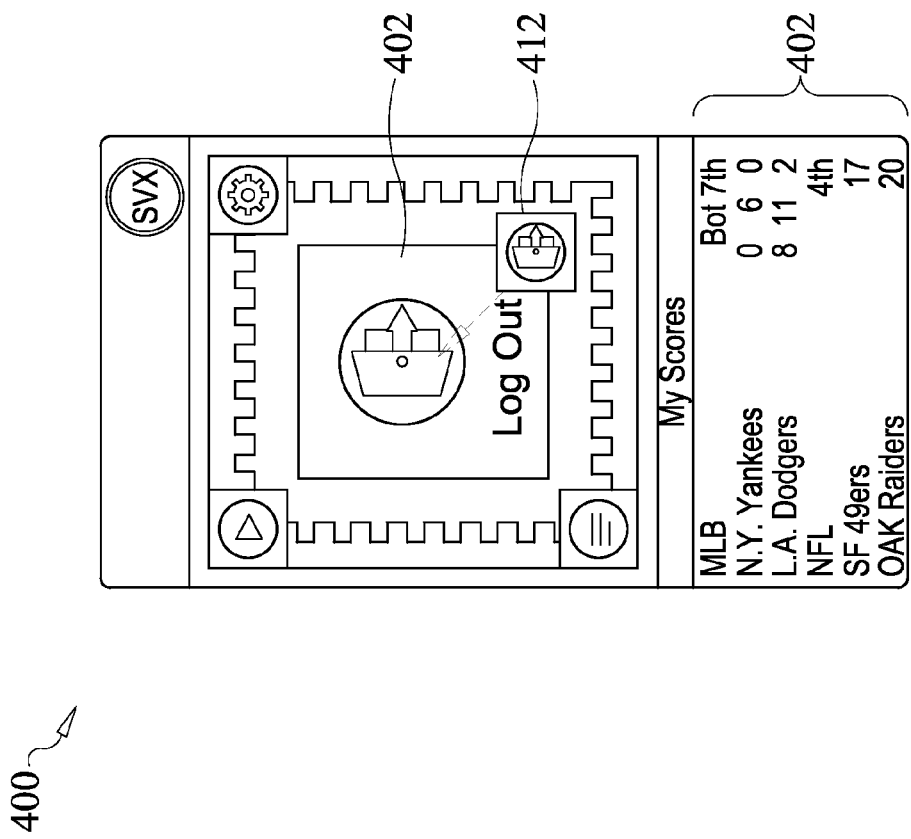

FIGS. 4H & 4I show an exemplary embodiment of the system 400 of the invention according to another embodiment. User may view multimedia content 402 that may comprise of text, e.g. scores 112 for teams that are broadcasted according to the system 400 and methods disclosed herein. For example, user may access the icon 410 corresponding to the control command for "Displaying Sports Scores, by dragging the desired icon 410 to the activation area 404 the interactive action icon 410 becomes visible and the command description (e.g. "All Scores") may be displayed therein. By dragging and releasing the icon 410 into the activation area 404, it executes the action. Here the user is transported to a selection screen 416 from which user may select from a displayed list, for example the desired game (or team) score to be displayed from a sports category. If the final score for the game is available, the video 112 more than likely will be available for viewing contemporaneously to the end of the game. User may also view any available video 404 of games that correspond to the available scores 112. In some embodiments by tapping the scores it directs the user to the activation area 404, from which user may select which video broadcast 404 is to be viewed as shown in FIG. 4H.

In FIG. 4I, user may activate the icon 412 for the command to logout of the CGUI 305 by long tapping or holding the icon 412 and dragging and releasing it into the activation area 404 and the corresponding command becomes visible and user can logout of the CGUI 305.

In yet another embodiment, the system 100 may be configured to use the signal processor 130 to capture an image(s) being presented on the media device(s) 102, and push the image(s) to the sports access application 112 (e.g. to populate menu options with images of the multimedia content 402 being played) so that the user can see which content 402 are available for selection, and then select the audio broadcast stream that corresponds to the content. In some embodiments, the image may be received from a remote server, wherein said remote server may be connected to the signal processor 130 via a wide area network, such as the internet.

In yet another embodiment, sports access application 112 may be configured to prompt a user for a password to access the audio broadcast.

In yet another embodiment, sports access application 112 may be downloaded by user by providing user with a hyperlink to download sports access application 112. Sports access application 112 may be provided via an online application store, such as Google Play™, Apple App Store™, via a website, or locally, via the WLAN 108.

Methods

Figure 5:
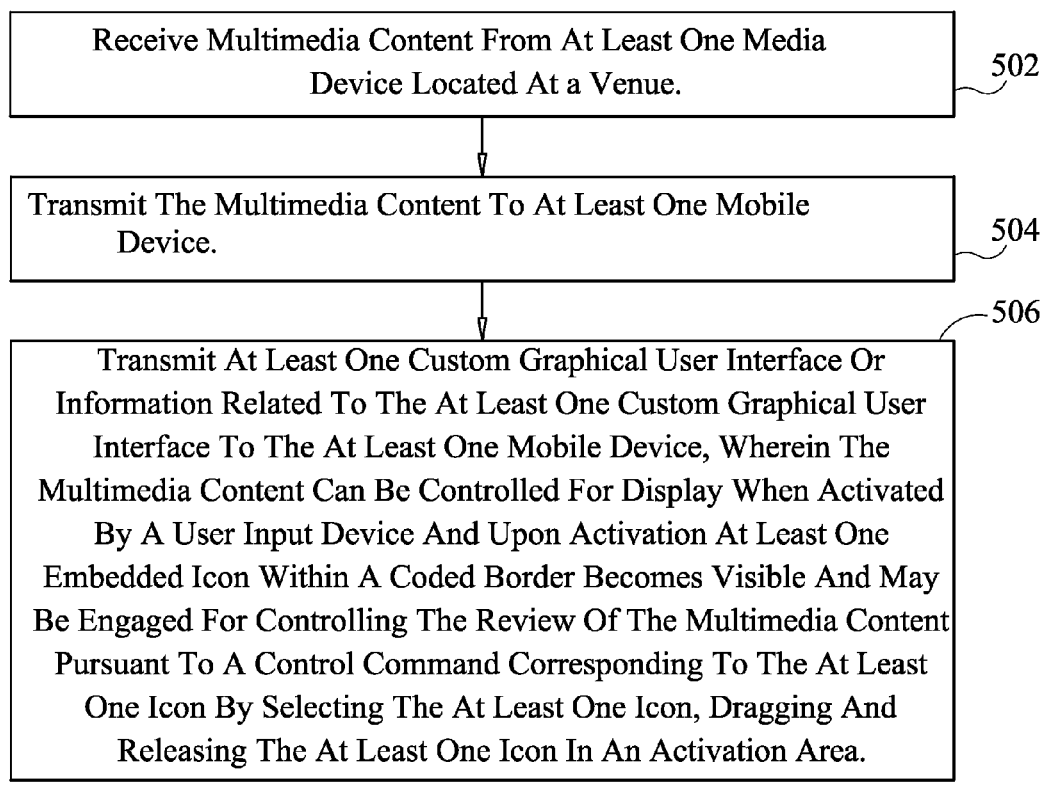
FIG. 5 is an exemplary method according to another embodiment.

FIG. 5 is an exemplary embodiment of a computer implemented method 500 according to one embodiment. Method 500 comprises using at least one signal processor 104 that comprises of computer executable instructions executable by the signal processor 104 and configured for configured to capture and transmit (or broadcast) audio (or video) being played by the media device 102.

Method 500 comprises receiving multimedia content 402 from at least one media device 102 located at a venue (e.g. home) (step 502); transmit the multimedia content 402 to at least one mobile device 110 (step 504); and transmit at least one CGUI 305 or information related to the at least one CGUI 305 to the at least one mobile device 110, wherein the multimedia content 402 can be controlled for display when activated by a user input device and upon activation at least one or more embedded icons 406, 408, 410, 412 within a coded border becomes visible and may be engaged for controlling the review of the multimedia content 402 pursuant to a control command corresponding to each icon 406 by selecting the at least one icon 406, dragging and releasing the at least one icon 406 in an activation area 404 (step 506).

In some embodiments, method 500 comprises receiving the at least one CGUI 305 or information pertaining to the at least one CGUI 305 from at least one server, where the information, e.g. multimedia content 402 may be viewed on a mobile device 110 remote to the venue where the media device 102 is located. Method 500 also comprises the sports access application 112 displaying the at least one multimedia content 402 within the coded frame with full functionality for review and control. In some embodiments, sports access application 112 is further configured for retrieving the at least one multimedia content 402 by linking to at least one media device 102 located at a venue for receipt of authorized content that is capable of being broadcasted to the user.

Figure 6:
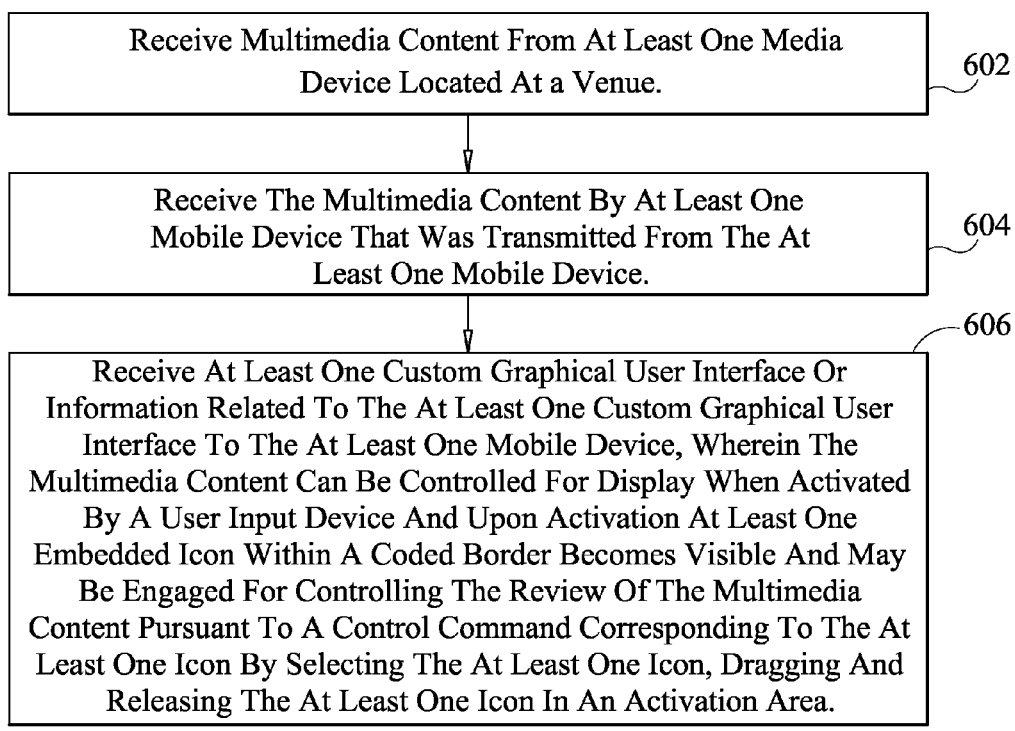
FIG. 6 is an exemplary method according to another embodiment.

FIG. 6 is an exemplary embodiment of a computer implemented method 600 according to one embodiment. Method 600 comprises receiving multimedia content 402 from at least one media device 102 located at a (remote) venue (step 602); receiving the multimedia content 402 by at least one mobile device 110 that was transmitted from the at least one media device 102 (step 604); and receive at least one CGUI 305 or information related to the at least one CGUI 305 to the at least one mobile device 110, wherein the multimedia content 402 can be controlled for display when activated by a user input device and upon activation at least one or more embedded icons 406, 408, 410, 412 within a coded border becomes visible and may be engaged for controlling the review of the multimedia content 402 pursuant to a control command corresponding to each icon 406 by selecting the at least one icon 406, dragging and releasing the at least one icon 406 in an activation area 404 (step 606).

Hardware and Operating Environment

This section provides an overview of exemplary hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the method 400 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
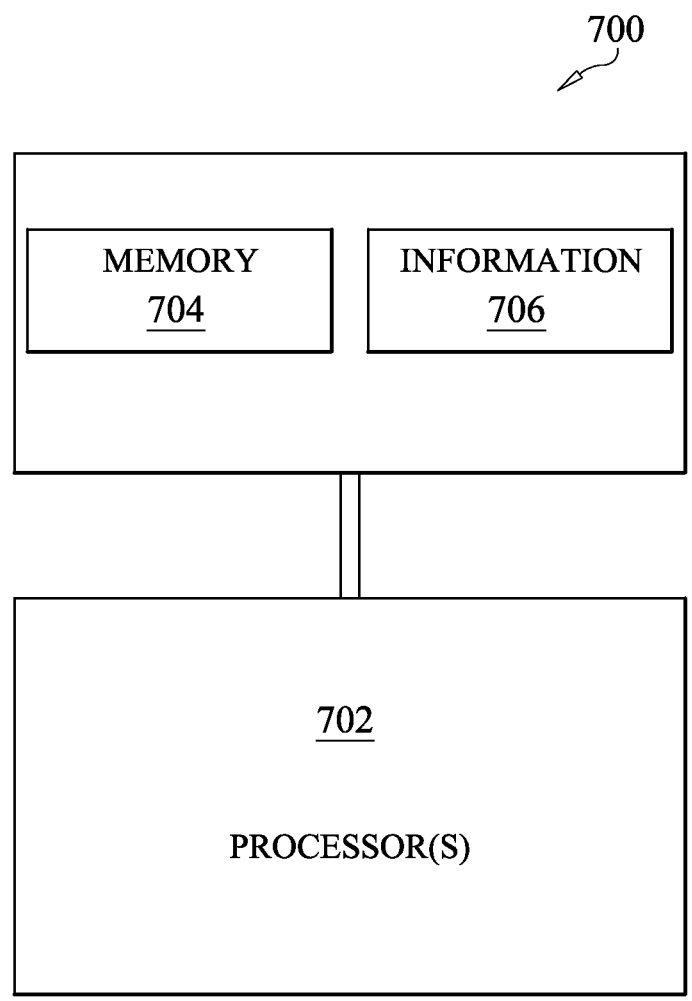
FIG. 7 is a block diagram representing an apparatus according to various embodiments.

FIG. 7 is a block diagram representing an apparatus 100 according to various embodiments. Such embodiments may comprise a computer; a memory means 702, a magnetic or optical disk, some other storage device, or any type of electronic device or system. The apparatus 700 may include one or more processor(s) 702 coupled to a machine-accessible medium such as memory means 704 (e.g., a memory including electrical, optical, or electromagnetic elements). The medium may contain associated information 706 (e.g., computer program instructions, data, or both) which, when accessed, scores in a machine (e.g., the processor(s) 702) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A system comprising:
    at least one processor; and
    computer executable instructions executable by the computer processor and configured for causing the computer processor to:
    receive a plurality of different broadcasted multimedia content from a plurality of different media providers on a plurality of different media devices located in at least one venue;
    receive via at least one custom graphical user interface, a selection of at least one of the plurality of different media devices and its corresponding broadcasted multimedia content to be received on a discrete at least one mobile device;
    transmit the selected at least one broadcasted multimedia content from the selected at least one media device to the at least one mobile device, wherein display of the multimedia content on the mobile device is enabled for control when activated by a user input device and upon activation, at least one embedded icon becomes visible and enabled for controlling review of the multimedia content pursuant to a control command corresponding to the activated at least one icon by selecting the at least one icon, dragging and releasing the at least one icon in an activation area.

2. The system of claim 1, wherein at least one processor is part of at least one content rebroadcasting device located at the venue.

3. The system of claim 1, wherein the computer executable instructions are further configured for searching a plurality of multimedia content for at least one search result based on the user's search criteria.

4. The system of claim 3, wherein the computer executable instructions are further configured for channeling, displaying and/or publishing on the mobile device the at least one search result in audio, video, pictorial, text message, graph or an alert.

5. The system of claim 1, wherein the at least one multimedia content includes any one or more of the following: videos, television broadcasts, sports scores, text, graphics, promotions, television commercials, radio broadcasts, print advertisements, movies, and movie trailers.

6. The system of claim 1, wherein the at least one control command corresponding to the at least one embedded icon includes any one of the following: display multimedia content, customize settings, display scores, and manage video.

7. The system of claim 6, wherein the at least one control command for displaying the multimedia content include but are not limited to any one or more of the following: remove video, change video, play, stop, fast-forward, rewind, pause, maximize viewing, minimize, end and cancel.

8. The system of claim 1, wherein the computer executable instructions are further configured for displaying the at least one multimedia content within a coded frame with full functionality for review and control.

9. The system of claim 4, wherein the computer executable instructions are further configured for retrieving the at least one multimedia content by linking to the at least one media device located at a venue for receipt of authorized content.

10. A computer implemented method comprising:
    receive a plurality of different broadcasted multimedia content from a plurality of different media providers on a plurality of different media devices located in at least one venue;
    receive via at least one custom graphical user interface, a selection of at least one of the plurality of different media devices and its corresponding broadcasted multimedia content to be received on a discrete at least one mobile device;
    transmit the selected at least one broadcasted multimedia content from the selected at least one media device to the at least one mobile device, wherein display of the multimedia content on the mobile device is enabled for control when activated by a user input device and upon activation, at least one embedded icon becomes visible and is enabled for controlling review of the multimedia content pursuant to a control command corresponding to the activated at least one icon by selecting the at least one icon, dragging and releasing the at least one icon in an activation area.

11. The method of claim 10, wherein at least one processor is part of at least one content rebroadcasting device located at the venue.

12. The method of claim 10, further comprising searching a plurality of multimedia content for at least one search result based on the user's search criteria.

13. The method of claim 12, further comprising channeling, displaying and/or publishing on the mobile device the at least one search result in audio, video, pictorial, text message, graph or an alert.

14. The method of claim 10, wherein the at least one multimedia content includes any one or more of the following: videos, television broadcasts, sports scores, text, graphics, promotions, television commercials, radio broadcasts, print advertisements, movies, and movie trailers.

15. The method of claim 10, wherein the at least one control command corresponding to the at least one embedded icon includes any one of the following: display multimedia content, customize settings, display scores, and manage video.

16. The method of claim 15, wherein the at least one control command for displaying the multimedia content include but are not limited to any one or more of the following: remove video, change video, play, stop, fast-forward, rewind, pause, maximize viewing, minimize, end and cancel.

17. The method of claim 10, further comprising displaying the at least one multimedia content within a coded frame with full functionality for review and control.

18. The method of claim 10, further comprising retrieving the at least one multimedia content by linking to at least one media device located at a venue for receipt of authorized content.

19. A computer implemented method comprising:
    receiving a selection of at least one of a plurality of different multimedia content from a plurality of different media providers via a plurality of different content rebroadcasting devices located at a venue; and receiving the selected multimedia content from the at least one corresponding content rebroadcasting devices, by at least one discrete mobile device, wherein display of the multimedia content on the mobile device is enabled for control when activated by a user input device and upon activation, at least one embedded icon becomes visible and is enabled for controlling review of the multimedia content pursuant to a control command corresponding to the activated at least one icon by selecting the at least one icon, dragging and releasing the at least one icon in an activation area.

20. The system of claim 1, wherein the processor is configured for capturing an image being presented on the at least one media device, and pushing the image to an application software for user selection of the broadcasted multimedia content.

21. The method of claim 10, further comprising using the processor to capture an image being presented on the at least one media device, and pushing the image to an application software for user selection of the broadcasted multimedia content.

* * * * *